United States Patent [19]

Hering et al.

[11] 4,013,274
[45] Mar. 22, 1977

[54] APPARATUS FOR GUIDING AND SEATING A STIRRER SHAFT FOR LABORATORY OR INDUSTRIAL GLASS APPARATUS

[75] Inventors: Günter Hering, Michelbach; Werner Engels, Rodenbach, both of Germany

[73] Assignee: Deutsche Gold- und Silber-Scheideanstalt vormals Roessler, Frankfurt, Germany

[22] Filed: June 3, 1976

[21] Appl. No.: 692,372

[30] Foreign Application Priority Data

June 5, 1975 Germany ............... 2524911

[52] U.S. Cl. .................. 259/102; 308/72; 259/DIG. 46
[51] Int. Cl.$^2$ .......................... B01F 7/22
[58] Field of Search ............ 259/106, 107, 108, 6, 259/5, 7, 8, 118, 121, 122, DIG. 46; 308/29, 72, 140, 142, 143, 173, 174, 177; 23/252 R

[56] References Cited
UNITED STATES PATENTS

| | | | |
|---|---|---|---|
| 985,358 | 2/1911 | Mackintosh | 308/142 |
| 2,129,992 | 9/1938 | Mattia | 302/142 |
| 2,162,400 | 6/1939 | Heath | 259/108 |
| 2,556,854 | 6/1951 | Spears | 259/108 |
| 2,958,517 | 11/1960 | Harker | 259/108 |
| 3,265,368 | 8/1966 | Nocera | 259/108 |

*Primary Examiner*—Robert W. Jenkins
*Attorney, Agent, or Firm*—Cushman, Darby & Cushman

[57] ABSTRACT

There is provided an apparatus for guiding and seating a stirrer shaft for laboratory or industrial glass apparatus which consists of bearings and abutments and makes possible a change in the angle of slope of the stirrer shaft axis in the apparatus, wherein the bearing consists of a smooth disc with a concentrically arranged, spherical recess at whose deepest position there is arranged a conical bore breaking through the disc, and a body with a spherical surface and a central, axial bore which is rotatably fitted in the spherical recess of the smooth disc, whereby the stirrer shaft can be so affixed in the bore of the body, that it projects through the bore in the disc and has a stop in the abutment.

9 Claims, 3 Drawing Figures

APPARATUS FOR GUIDING AND SEATING A STIRRER SHAFT FOR LABORATORY OR INDUSTRIAL GLASS APPARATUS

The invention concerns an apparatus for guiding and seating a stirrer shaft for laboratory or industrial glass apparatus which consists of bearings and abutments and makes possible a change in the angle of slope of the stirrer shaft axis.

In chemical reactions in laboratory or industrial vessels it is frequently necessary to mechanically move the reaction materials. Thus, it happens, inter alia, that there are employed stirrers on which there is affixed to the ends coming in contact with the reaction materials a suitably formed, e.g., propeller shaped, workpiece of glass, steel, etc.

Stirrers also are used in physical processes, for example in distillation of liquid mixtures, to avoid delays in boiling, for example.

In the distillation of temperature sensitive materials there are used thin film evaporators which have a stirrer, that quickly rotates at a small distance from the wall of the evaporator and, therefore, provides that the liquid in the diameter of the gap between the wiper blade and wall runs down on the wall and thereby is constantly held in motion.

A thin layer evaporator of the Sambay type uses movably supported wipers, which are pressed against the wall by the centrifugal force of the rotating stirrer and produce a very thin film of several lengths of a millimeter (Fortschritt der Verfahrenstechnik 1952/53, pages 246–248).

It is known to guide the operating end of the stirrer shaft by a capillary bushing (KPG stirrer), stuffing box, inter alia, which is fastened to the entrance of the reaction vessel by means of a ground in connecting piece. Additionally known seating apparatus include Teflon cylinders cemented in glass with bores for the passage of the shaft or expensive rotary seats.

These types of stirrer shafts guides and seatings, however, have the disadvantage that in the rotation of the shaft of the stirrer at up to 2000 revolutions per minute a high vacuum can not be held well in the reaction vessel, as can be necessary when using a thin film evaporator of the Sambay type, because gaps in rotating part as is well known make for poor seats.

In the use of Teflon cylinders cemented in glass, a destruction of the cementation can take place due to chemical influence.

Furthermore, it is very difficult in the production of thin layer evaporators of the Sambay type or other glass apparatus to carry out guiding and seating of double seated stirrer shafts in absolutely central shape. In the mechanical preparation, a manual centering is unavoidable, whereby the necessary exactitude cannot always be reached.

An inexact centering of the stirrer shaft, for example, in a thin layer evaporator of the Sambay type up to 2000 mm long makes it impossible to use the stirrer with a rigid fastening of the stirrer shaft by means of a ground bushing because a tilting of the stirrer shaft prevents its rotation.

The problem of the invention is to develop an apparatus for guiding and mounting a stirrer shaft which does not have the above mentioned disadvantages and makes possible a change of the angle of slope of the axis of the stirrer shaft.

The object of the invention is the development of an apparatus for guiding and seating a stirrer shaft for laboratory or industrial glass apparatus which consists of bearings and abutments and makes possible a change in the angle of slope of the stirrer shaft axis in the apparatus wherein the bearing consists of a smooth disc with a concentrically arranged, spherical recess at whose deepest portion there is arranged a conical bore breaking through the disc, and a body with a spherical surface, and a central, axial bore which is rotatably fitted in the spherical recess of the smooth disc, whereby the stirrer shaft can be affixed in the bore of the body, that it projects through the bore in the disc and stops in the abutment.

The abutment can consist of a smooth disc with a concentrically arranged, spherical recess at whose lowest portion there is arranged a conical bore breaking through the disc, and a body with a spherical surface, and a central axial bore which is rotatably fitted in the spherical recess of the smooth disc, whereby the stirrer shaft can be affixed in the bore of the body, that it projects through the bore in the disc and has a stop in the abutment.

In the apparatus of the invention, the stirrer shaft can be fastened in the body with spherical surfaces by means of adjustable set screws.

In a special form of the invention, the body with spherical surface can be a cylinder with a hemisphere corresponding to its radius.

The individual apparatus parts can consist of glass, VA-steel and synthetic resin, as, for example, Teflon (a trademark for poly(tetrafluoroethylene)). There can also be used noble metal coating materials.

Thus, in the apparatus of the invention, the body with spherical surfaces as well as the discs suitably are made of Teflon. In the use of Teflon for the discs the body with spherical surface can also be made of steel. It is essential hereby to use materials which permit a low abrasion, if necessary self-lubricating, quick movement to the boundary surface between disc and body with ball-shaped surface. The stirrer shaft can be manufactured of glass or steel.

The stirrer can be connected by means of a clutch consisting of opposite poled permanent magnets with a drive unit.

The rotating stirrer shaft is completely inside the closed apparatus if a permanent magnet clutch is used. This has the advantage that no seating problems occur in high vacuum distillations, for example, with a thin film evaporator of the Sambay type.

The apparatus of the invention, furthermore, has the advantage that it is possible to use a stirrer also in an inexactly centered stirrer shaft arrangement in laboratory apparatus, for example, in a thin layer evaporator of the Sambay type, because a tilting of the stirrer shaft and therewith a stopping of the stirrer cannot occur.

The invention will be understood best in connection with the drawings wherein.

In the drawings, like numbers refer to like parts.

Figure 1:
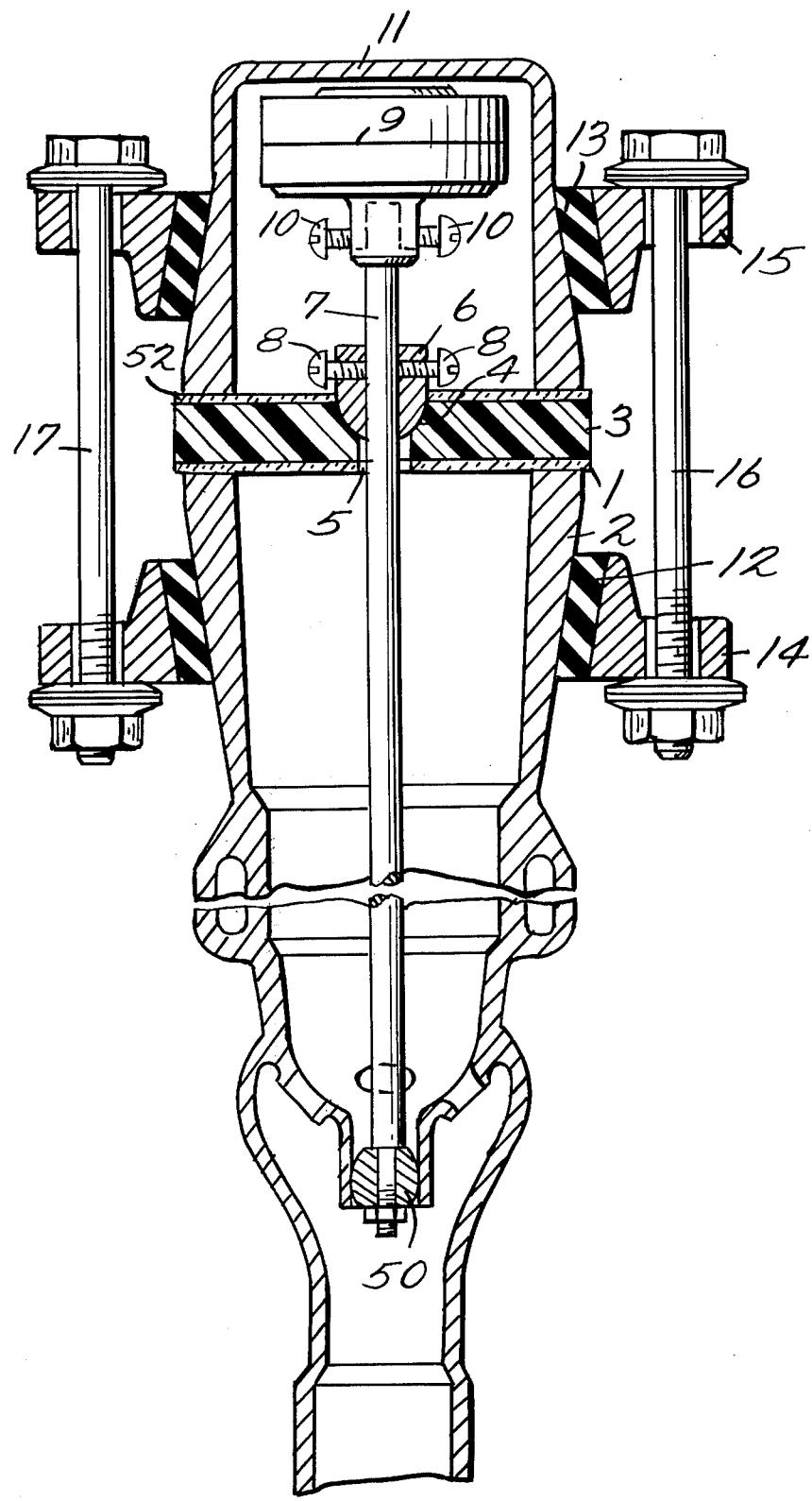
FIG. 1 is a schematic drawing of the bearing of the invention with an abutment according to the state of the art (pendulum bearing) carried out on a thin-layer evaporator of the Sambay type.

Referring more specifically to FIG. 1 of the drawings, a disc 3 of Teflon is disposed on the plane ground surfaced flange 1 of a glass thin layer evaporator of the Sambay type. In the middle of this disc 3 is the spherical recess 4 at the lowest point of which is located the conical bore 5. In the recess 4 is the body 6 made of V2A steel, having a spherical surface, consisting of a cylinder and a hemisphere corresponding to its radius, rotatably fitted in the recess. The stirrer shaft 7 made of VA steel is centrally pushed through the body 6 so that it projects through the bore 5 in the disc 3 and is rotatably fastened to the abutment 50. The stirrer shaft 7 is fastened in the body 6 by means of a set screw 8. At the upper end of the stirrer shaft 7 there is fastened a part 9 of a permanent magnetic clutch by means of the set screw 10. (The remaining part of the clutch which is not shown is fastened to the drive unit). Above the part 9 of the permanent magnet-clutch there is the inverted cap or dome 11 made of glass whereby the mobility of the stirrer shaft 7 is not impaired. This cap 11 with its plane ground tip 52 is supported by the upper surface of the disc 3. It is so shaped on the outside that its periphery widens toward the tip. By means of the clamping rings 14 and 15 cushioned by the rubber rings which clamping rings are held together by the screws 16 and 17 they are firmly forced on the disc 3 and this is then forced on the plane ground tip 1 of the collar 2.

Figure 2:
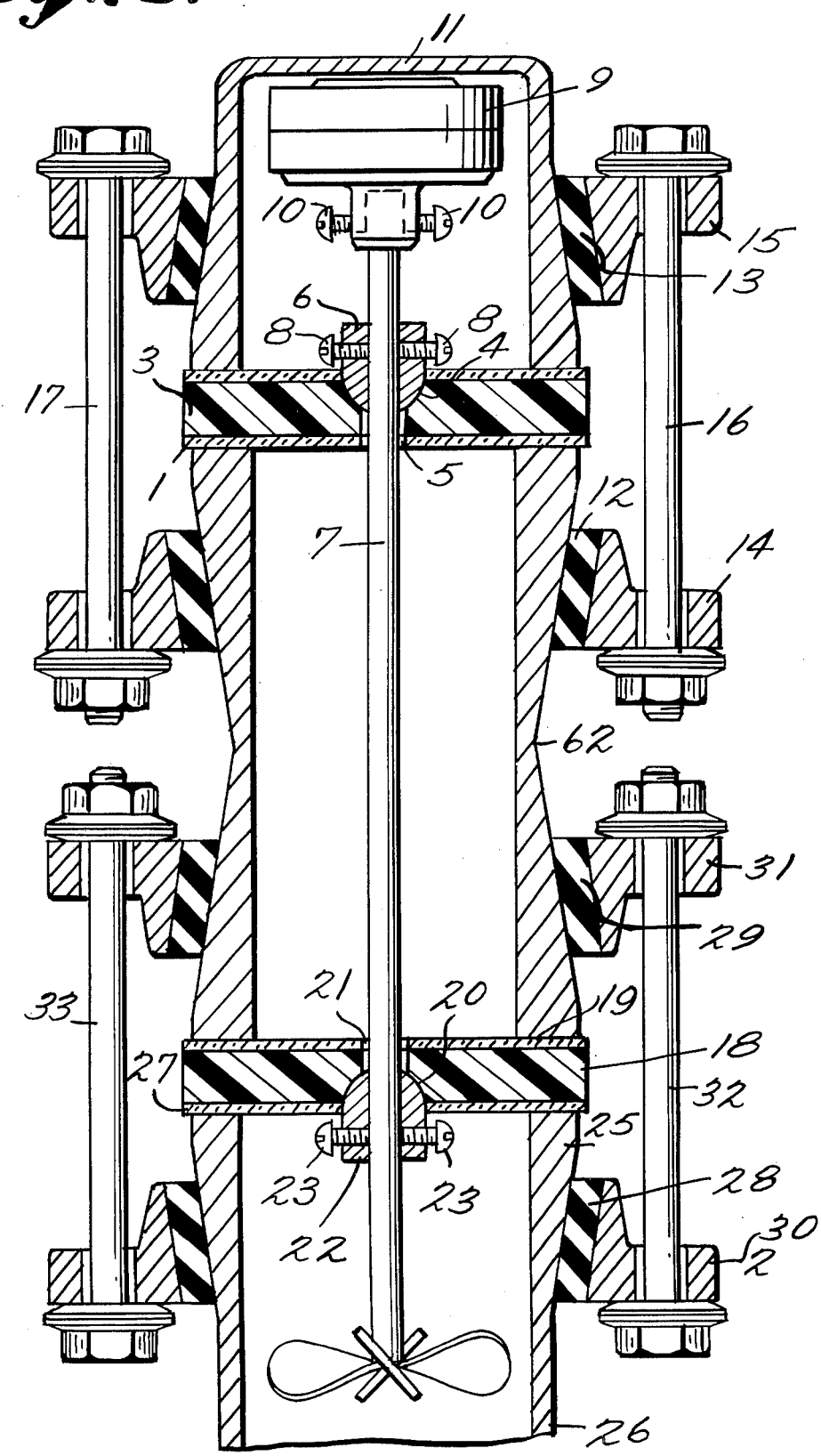
FIG. 2 is a schematic drawing of a bearing of the invention with an abutment according to the invention.

According to FIG. 2, there is placed on the ground tip 1 of the glass column 62 which is of increased thickness from the middle to the ends a disc 3 made of Teflon. The disc 3 has the spherical recess 4 in the middle thereof, at its lowest point there is located the bore 5. In the recess 4 there is rotatably fitted the body 6 made of VA steel having a spherical surface consisting of a cylinder and a hemisphere corresponding to its radius. The stirrer shaft 7 made of VA steel is centrally pushed through the body 6 so that it projects through the bore 5 in the disc 3. The stirrer shaft 7 is secured in the body 6 by means of a set screw 8. At the upper end of the stirrer shaft there is fastened a part 9 of a permanent magnet clutch by means of the set screw 10. The remaining part of the clutch is fastened to the drive unit. Above the part 9 of the permanent magnet clutch there is located an inverted cap 11 of glass whereby the stirrer shaft is movable. This cap 11 with its planar ground tip or lip 52 is supported by the upper surface of the disc 3. It is so shaped on the outside that its periphery widens toward the tip. By means of the clamping rings 14 and 15 cushioned by the rubber rings 12 and 13 which are held together by means of the screws 16 and 17, the cap 11 is firmly forced on the disc 3 and this is forced on the planar ground tip 1 of the glass collar 62.

Across the stirrer shaft 7, there is thrust a wide disc 18 made of Teflon which rests upon the planar ground tip, flange or lip 19 of the collar 62. The disc 18 in the middle has a spherical recess 20 at the lower point of which is located the conical bore 21. There is fitted in the recess 20 body 22 made of VA steel having a spherical surface consisting of a cylinder and a hemisphere corresponding to its radius. The stirrer shaft 7 is centrally pushed through the body 22 and is fastened by means of set screw 23.

The free end of the stirrer shaft 7 which carries the propeller for moving the reaction materials, is inserted into the reaction vessel 26 through the neck 25 which is thickened toward the outer end. The lower surface of the disc 18 rests on the planar ground lip 27 of the neck 25. The column 62 is forced on the disc 18 by means of the clamping rings 30 and 31 cushioned by rubber rings 28 and 29 and held together by screws 32 and 33 and the disc 18 is forced on the lip 27 of the neck 25.

Figure 3:
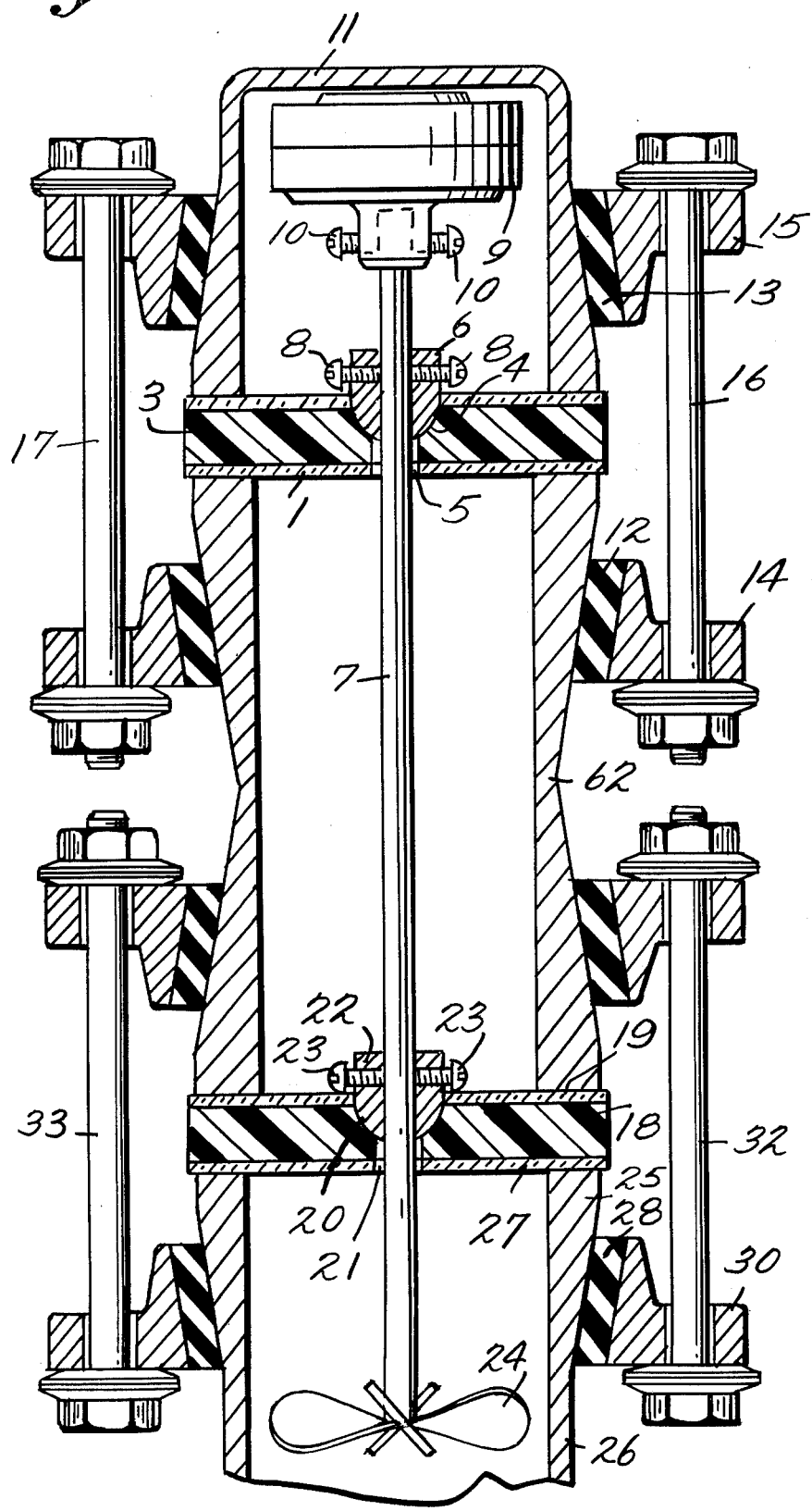
FIG. 3 is a schematic drawing of the apparatus of the invention with an alternate form of an abutment according to the invention.

According to FIG. 3 there is placed on the planar ground lip 1 of the glass column 62 which is thickened toward its ends, a disc 3 of Teflon whereby there is fitted a Teflon ring between the lip and the disc to increase the seal. The disc 3 in the middle has a spherical recess 4 at the lowest point of which there is located the bore 5. In the recess 4 there is rotatably fitting supported a body 6 made of V2A steel having a spherical surface consisting of a cylinder and a hemisphere corresponding to its surface. The stirrer shaft 7 made of V2A steel is centrally pushed through the body 6 so that it projects through the bore of disc 3. The stirrer shaft 7 is fastened in the body 6 by means of a set screw 8. At the upper end of the stirrer shaft 7, there is fastened a part 9 of a permanent magnet clutch by means of the set screw 10. The other, not shown, part of the clutch is fastened to the drive unit. Above the part 9 of the permanent magnet clutch there is an inverted cap 11 made of glass, whereby the stirrer shaft 7 is movable. The cap 11 with its planar ground lip is supported by the upper surface of the disc 3 whereby, to increase the sealing, there is inserted a Teflon ring between the lip and Teflon disc 3.

By means of the clamping rings 14 and 15 cushioned by the rubber rings 12 and 13 which clamping rings are held together by screws 16 and 17, the cap 11 is forced securely on the disc 3 and this is forced on the planar ground lip 1 of the glass column 2.

Across the stirrer shaft 7 there is thrust the body 22 made of V2A steel having a spherical surface and consisting of a cylinder and a hemisphere corresponding to its radius, which body 22 is fitted in the spherically shaped recess 20 of the disc 18 and is fastened by means of set screws 23. The disc 18 is supported by the planar lip 19 of collar 62, whereby there is fitted a Teflon ring between the lip and Teflon disc 18 in order to increase the seal. There is located the conical bore at the lowest point of the centrally arranged recess 20, through which the stirrer shaft 7 is forced.

The free end of the stirrer shaft 7 which carries the propeller 24 for moving the reaction materials is inserted into the reaction vessel through the neck 25. The lower surface of the disc 18 rests on the planar ground lip 27 of the neck 27 whereby a Teflon ring is inserted between the lip and disc 18 to increase the seal. The column 62 is forced on the disc 18 by means of the clamping rings 30 and 31 cushioned by rubber rings 28 and 29 and held together by the screws 32 and 33 and the disc is forced on the lip 27 of the neck 25.

What is claimed is:

1. Apparatus for guiding and sealing a stirrer shaft for laboratory or industrial glass apparatus, comprising:
    a stirrer shaft, rotatable about a shaft axis;
    a housing for containing said shaft;
    an abutment means in said housing for contacting said shaft;
    bearing means for mounting said stirrer shaft in said housing so that the angle between said stirrer shaft axis and a vertical axis may be adjusted, said bearing means including a smooth disc having a concentrically disposed spherical recess therein, a conical bore located at the lowest point of said recess and passing through said disc, and a body having a spherical surface and a central axial bore rotatably mounted in said spherical recess of said disc; and means for affixing said stirrer shaft in said bore of said body so that it projects through said bore in said disc and extends to said abutment.

2. Apparatus as recited in claim 1, further comprising a magnetic clutch mounted in said housing and operatively connected to said shaft and to a means for rotating said shaft about said shaft axis.

3. Apparatus as recited in claim 1, wherein said disc and said body are constructed of low abrasion materials.

4. Apparatus as recited in claim 3, wherein said disc and said body and body spherical surfaces are polytetrafluoroethylene.

5. Apparatus as recited in claim 1, wherein said means for affixing said stirrer shaft in said bore of said body includes a set screw passing through said body and operatively engaging said stirrer shaft.

6. Apparatus as recited in claim 1, wherein said abutment means comprises a smooth disc with a spherical recess in a middle portion thereof, a conical bore extending through said smooth disc at the lowest point of said disc, and a body comprising a spherical surface and a central axial bore, said body being rotatably mounted in said spherical recess so that the stirrer shaft when attached to the bore of the body projects through said body bore for rotation with respect to said disc.

7. Apparatus as recited in claim 6, wherein said abutment means and said bearing means body each comprise a cylinder having a hemisphere thereon corresponding to the radius of said cylinder.

8. Apparatus as recited in claim 6, wherein said stirrer shaft is secured to said bearing means body and said abutment means body by set screws.

9. Apparatus as recited in claim 6, further comprising a magnetic clutch operatively connecting said stirrer shaft to a driving means for rotating said shaft about said shaft axis, said magnetic clutch being connected to a portion of said stirrer shaft disposed on the opposite side of said bearing means from said abutment means.

* * * * *